US010228904B2

(12) United States Patent
Raux

(10) Patent No.: US 10,228,904 B2
(45) Date of Patent: Mar. 12, 2019

(54) GAZE TRIGGERED VOICE RECOGNITION INCORPORATING DEVICE VELOCITY

(71) Applicant: Lenovo (Singapore) Pte. Ltd., Singapore (SG)

(72) Inventor: Antoine Roland Raux, Cupertino, CA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 277 days.

(21) Appl. No.: 14/539,495

(22) Filed: Nov. 12, 2014

(65) Prior Publication Data

US 2016/0132290 A1    May 12, 2016

(51) Int. Cl.
*G10L 15/22* (2006.01)
*G06F 3/01* (2006.01)
*G06F 3/12* (2006.01)
*G06F 3/16* (2006.01)

(52) U.S. Cl.
CPC .............. *G06F 3/167* (2013.01); *G06F 3/013* (2013.01); *G10L 15/22* (2013.01); *G06F 3/1208* (2013.01); *G10L 2015/223* (2013.01); *G10L 2015/227* (2013.01)

(58) Field of Classification Search
CPC ........ G06F 3/167; G06F 3/013; G06F 3/1208; G10L 15/22
USPC .................................................. 345/173, 156
See application file for complete search history.

(56) References Cited

U.S. PATENT DOCUMENTS

| 6,970,824 | B2 | 11/2005 | Hinde et al. | |
| 2002/0105575 | A1 | 8/2002 | Hinde et al. | |
| 2013/0307771 | A1 | 11/2013 | Parker et al. | |
| 2014/0184550 | A1* | 7/2014 | Hennessey | G06F 3/013 345/173 |
| 2014/0350942 | A1 | 11/2014 | Kady et al. | |
| 2015/0109191 | A1* | 4/2015 | Johnson | G10L 15/22 345/156 |
| 2015/0207957 | A1* | 7/2015 | Lee | G06F 3/1208 358/452 |

FOREIGN PATENT DOCUMENTS

| CN | 104023127 A | 9/2014 |
| EP | 1215658 A2 | 6/2002 |
| EP | 2806335 A1 | 11/2014 |

* cited by examiner

*Primary Examiner* — Farzad Kazeminezhad
(74) *Attorney, Agent, or Firm* — Ference & Associates LLC

(57) ABSTRACT

One embodiment provides a method, involving: detecting, at an electronic device, a location of user gaze; activating, based on the location of the user gaze, a voice input module, wherein the activating is based on a command input using a modality that detects an input in combination with the location of the user gaze, the modality comprising a change in velocity of the device; detecting, at the electronic device, a voice input; evaluating, using the voice input module, the voice input, and performing, based on evaluation of the voice input, at least one action. Other aspects are described and claimed.

18 Claims, 4 Drawing Sheets

FIG. 3

GAZE TRIGGERED VOICE RECOGNITION INCORPORATING DEVICE VELOCITY

BACKGROUND

With the creation of intelligent digital personal assistants, (e.g., SIRI, S Voice, GOOGLE NOW, CORTANA, and HIDI) the use of voice commands to control electronic devices has become extremely popular. SIRI is a registered trademark of Apple Inc. in the United States and other countries. S VOICE is a registered trademark of Samsung Electronics Co. in the United States and other countries. GOOGLE is a registered trademark of Google Inc. in the United States and other countries. CORTANA is a pending trademark of Microsoft in the United States and other countries. Generally, a user interacts with a voice input module, for example embodied in a personal assistant through use of natural language. This style of interface allows a device to receive voice inputs, e.g., voice commands, from the user (e.g., "What is the weather tomorrow," "Call Dan") process those requests and perform the user's desired actions by carrying out the task itself or delegating user requests to a desired application.

Because natural language is a major method of communication that people are comfortable with, the ability to use voice commands offers a natural and efficient way to utilize functions of a device's operating system or applications, no matter how simple or complex. However, one of the major issues when utilizing the personal assistants is determining what portion of a user's speech is intended to be received as a voice command. Constantly listening to the user has proven too difficult a task to achieve with a usable level of false positives (i.e., the assistant responding to unrelated speech) and false negatives (i.e., the assistant ignoring user commands). In addition, the personal assistant can be an energy intensive application, thus allowing it to run constantly in the background could have a significant impact on battery life. In order to overcome this issue, most voice controlled assistants today make use of some form of trigger to initiate the voice recognition process. This trigger assumes that any speech directly following the trigger is a command directed to the assistant. Some common triggers are physical button presses (e.g., SIRI activation) and special key phrases to be spoken before any system-directed command (e.g., Okay GOOGLE).

BRIEF SUMMARY

In summary, one aspect provide a method, comprising: detecting, at an electronic device, a location of user gaze; activating, based on the location of the user gaze, a voice input module; detecting, at the electronic device, a voice input; evaluating, using the voice input module, the voice input, and performing, based on evaluation of the voice input, at least one action.

Another aspect provides an information handling device, comprising: a processor; at least one sensor operatively coupled to the processor; and a memory that stores instructions executable by the processor to: detect a location of user gaze; activate, based on the location of the user gaze, a voice input module; detect a voice input using the at least one sensor; evaluate, using the voice input module, the voice input, and perform, based on the evaluation of the voice input, at least one action.

A further aspect provides a product, comprising: a storage device having code stored therewith, the code being executable by the processor and comprising: code that detects a location of a user gaze; code that activates, based on the location of the user gaze, a voice input module; code that detects a voice input using a modality; code that evaluates, using the voice input module, the voice input, and code that performs, based on the evaluation of the voice input, at least one action.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example method of gaze triggered recognition.

DETAILED DESCRIPTION

Figure 1:
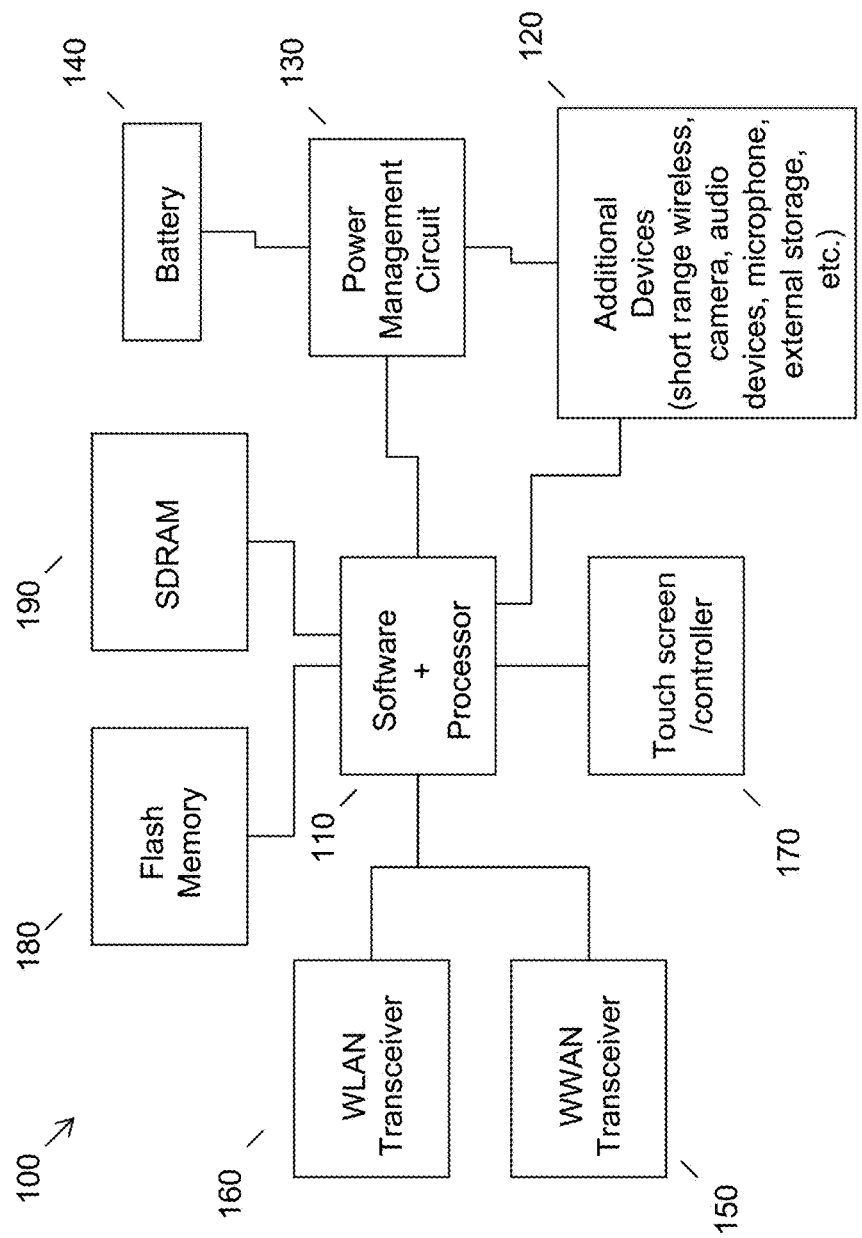
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An embodiment allows users to interact with an electronic device by tracking the user's gaze and using the location of a user's gaze as a trigger mechanism. For example, an embodiment may actively listen for audio input when the user's gaze is fixed on the upper right and corner of a smart phone screen. An embodiment thus conveniently and easily solves the need to manually trigger an electronic device to receive audio inputs such as voice commands.

Some currently available commercial systems use triggers that require the pressing of a particular button (e.g., pressing and holding the home button to activate SIRI, or pressing and holding the search button to activate CORTANA). An alternative method currently available is the use of a key phrase (e.g., saying "Hey SIRI" while a device running iOS 8 or later and is plugged in, or saying "Okay GOOGLE" while a device running ANDROID 4.3 is awake). ANDROID is a registered trademark of Google Inc. in the United States and other countries. Once a user speaks a key phrase, the device is triggered to listen for the voice commands following the key-phrase.

The main issue with the current methods of activating a trigger is that they tend to disrupt whatever task the user is currently involved in (e.g., exiting an application upon activation of the personal assistant). In particular, if a user is involved in performing a task that requires a keyboard, mouse, or touch input on the device (e.g., editing an email, editing a document, browsing photos, or viewing social networking), they will have to interrupt that task or possibly even close their current application to click, touch, or enter a separate area to access the personal assistant.

One current solution to the requirement of tactile input is the use of a key phrase. Currently most key phrases can only be used outside of third party applications, or require you to be in a certain menu or screen in the device's operating system (e.g., being in the GOOGLE now application before saying "Okay GOOGLE"). Thus, the key phrase triggers may not be as restrictive as the key press method, which can force the user to reposition their hand or use two hands to press a key. However, the method of using key phrases involves drawbacks as well. Even if the key phrase could be used while in a third party application, key phrase triggers must be spoken prior to each voice command given by the user. This constant and repetitive act places a burden on the user and undercuts the benefit of the natural language aspect of the intelligent assistant, which is one of its primary qualities.

Thus, an embodiment addresses these limitations by utilizing gaze tracking, which allows the user to trigger voice recognition by simply looking at a designated area on the device's display. An embodiment uses a sensor device that detects the location of a user's gaze. An embodiment then activates a voice input module, e.g., an intelligent assistant, which detects any speech commands from the user. The trigger could be activated by the user fixing their gaze on a particular corner of a device's screen, or looking at a predetermined location set by the user. Additionally, an embodiment could have an icon or even an animated character (e.g., CLIPPY, Microsoft's beloved office assistant) that the user is to focus on when they wish to activate the intelligent assistant.

It should be noted that while examples are provide herein focusing on an intelligent assistant, these examples are non-limiting and the general techniques may be applied to voice modules generally, such as provided for dictation in forms or within applications generally.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
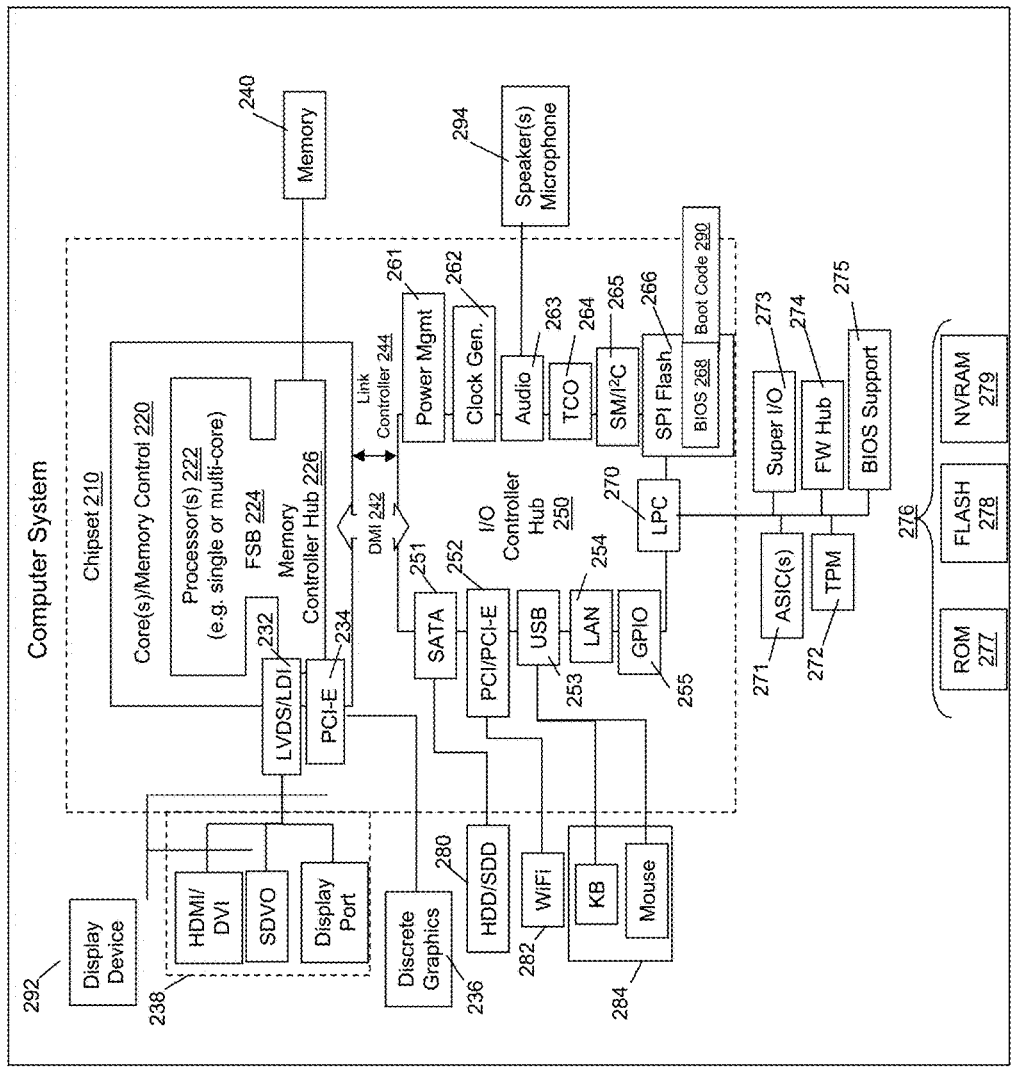
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to enter, record, or modify data. For example, the circuitry outlined in FIG. 1 may be implemented in a tablet or smart phone embodiment, whereas the circuitry outlined in FIG. 2 may be implemented in a personal computer embodiment.

It will be understood that such devices (e.g., a tablet computing device, personal computer, or smartphone), primarily offer touch screens, microphones and cameras as primary input devices, with current devices relying primarily on the touch screen and microphone inputs for application control. In an embodiment, fusion of such modalities provides a more user friendly experience, particularly for certain applications that may warrant the use of other input modalities not supported by such devices.

Figure 3:
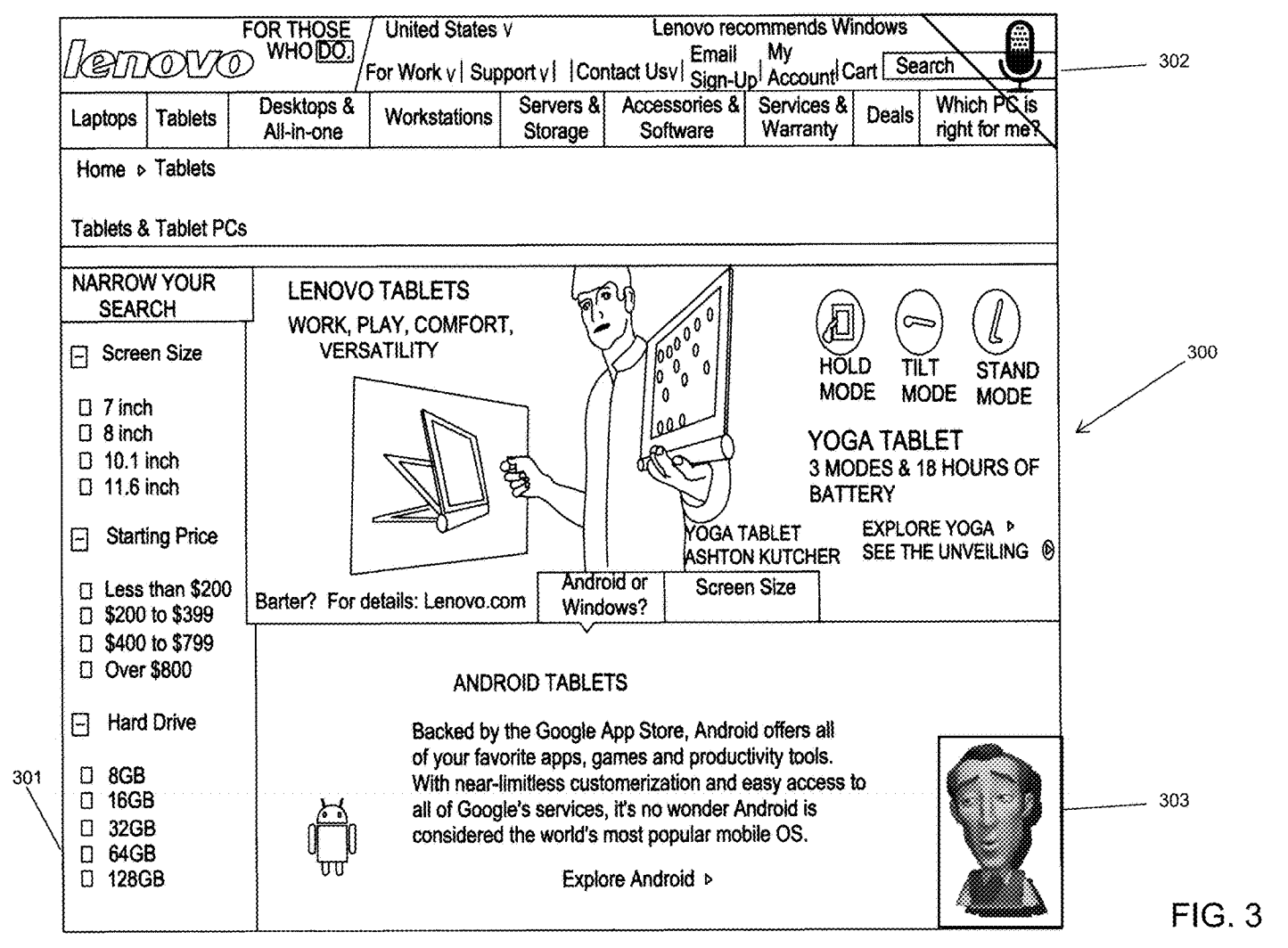

By way of example, and referring now to FIG. 3, a webpage is shown as would be viewed on a display of a typical information handling device such as a touch screen, 170 of FIG. 1, or a display device, 292 of FIG. 2. An embodiment allows a user to activate the intelligent digital personal assistant in a non-invasive fashion.

In an embodiment, the location of a user's gaze is detected using a sensor device. The sensor device may be housed within the information handling device (e.g., a webcam in a tablet, smartphone, personal computer, etc.). Additionally or alternatively, the sensor device could be separate device (e.g., a stand alone webcam, or a sensor such as a KINECT device). KINECT is a registered trademark of Microsoft Corporation in the United States and other countries. In a further embodiment, the sensor device could be any image capture device or video capture device. Additionally, the sensor could be of a more complex nature (e.g., a range imaging device, a 3D scanning device, etc.).

By way of example, in an embodiment, a user could be browsing a webpage 300 and wish to utilize the intelligent digital personal assistant to inquire about something on the website they are viewing. Instead of requiring the user to back out of their browser application, forcing them to press and hold a button, or repeat an annoying key phase, an embodiment allows the user to simply look at a predetermined location on the screen (e.g., the lower left corner 301). By looking at this predetermined location, the user would activate the personal assistant and any subsequent input (e.g., voice commands) would be interpreted as intended to be used by the personal assistant.

By way of further example, in an embodiment, a user could be browsing a webpage 300 and wish to utilize the intelligent digital personal assistant to issue a command about something nonrelated to the website they are viewing (e.g., adding an appointment to their calendar). Once again, instead of requiring the user to back out of their browser application, forcing them to press and hold a button, or repeat an annoying key phase the user could simply look at a predetermined icon on the screen (e.g., a microphone icon located on the screen 302). By looking at the icon, an intuitive symbol for speech recognition, the user would activate the personal assistant and any additional input (e.g., voice commands) would be interpreted as intended for use by the personal assistant.

In an additional embodiment, a user could be browsing a webpage 300 and wish to utilize the intelligent digital personal assistant to inquire about something on the third party application, (e.g., checking prices on an online shopping application). Once again, instead of requiring the user to back out of their browser application, forcing them to press and hold a button, or repeat an annoying key phase the user could simply look at an anthropomorphic agent on the screen (e.g., CLIPPY, an animated character located on the screen 303, or the like). By looking at visual representation of their personal assistant, the user would activate the personal assistant and any additional input (e.g., voice commands) would be interpreted as intended to be used by the personal assistant.

Figure 4:
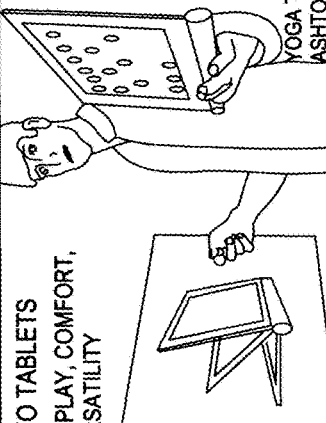
FIG. 4 illustrates a further example method of gaze triggered recognition.

In order to further increase the intuitive nature, an embodiment can alter the visual representation of the predetermined location. By way of example, and referring to FIG. 4, an embodiment could change color or highlight the predetermined location with a visual symbol 401 when the user directs his gaze at the location. This altering of the visual state of the location is a clear indicator to the user that the intelligent personal assistant is currently active, and would be able to receive further commands. Additionally, the altering of the visual state of the location enables the user to avoid false positives. If the user did not intend to activate the personal assistant, they could avoid issuing further commands and avert their gaze thus avoiding the need to cancel or exit the personal assistant application.

Additionally or alternatively, an embodiment can alter the visual representation of the predetermined icon. By way of example, and referring to FIG. 4, an embodiment could change background color or highlight the predetermined icon 402 when the user directs his gaze at the icon. In an additional embodiment, the icon could simply appear or disappear when the user's gaze is focused on the known location of the icon. This altering of the visual state of the icon as before is a clear indicator that the intelligent personal assistant is currently active. Additionally, the altering of the visual state of the icon enables the user to avoid false positives. If the user did not intend to activate the personal assistant, they easily avoid the need to cancel or exit the personal assistant activation. Thus saving the user time and frustration with the personal assistant.

In a further embodiment, the animated character could react to the user's visual focus. By way of example, and referring to FIG. 4 in comparison to 303 of FIG. 3, an embodiment could change the reaction of the animated character 403 when the user directs his gaze at its location. In an additional embodiment, the animated character could have multiple reactions depending on multiple circumstances (e.g., what application was open, how long the user's gaze was present, time of day, etc.) which could indicate to the user that the intelligent personal assistant was ready to receive a specific set of commands. Not only would this altering of the reaction of the character be a clear indicator that the intelligent personal assistant is currently active. Additionally, as before, the altering of the visual state of the location enables the user to avoid false positives. If the user did not intend to activate the personal assistant, they easily avoid the need to cancel or exit the personal assistant activation. Thus saving the user time and frustration when utilizing the personal assistant.

In an additional embodiment, the user can select which option they wish to utilize (e.g., the location, icon, character, etc.). Thus if a user found the animated character overly invasive or annoying, they could chose the simpler or cleaner option of the predetermined location. Alternatively, if a user had difficultly remembering the predetermined location they may choose to implement the icon and have it remain on the screen at all times thus allowing for easier identification. In a further embodiment, the user could select a personalized icon or character based on an image, video, third party application or the like.

Additionally, an embodiment allows the user to select the predetermined location of whatever mode of location identification they choose (e.g., predetermined location, icon, character, etc.). In addition to an overall default setting, a user may also set the location of the identifier based on which application the user has open (e.g., lower corners for browsers to avoid covering the uniform resource locater (URL)/search bar, upper corners for videos to avoid covering the play/time bar, etc.). In an additional embodiment, third party applications can have a preset preferred location based on the graphical user interface (GUI) of the application. In a further embodiment, this preset could be overruled by the user.

In addition to the ease of use, an embodiment allows for greater accuracy. A user may wish to further protect themselves from the possibility of false positives. Thus, an embodiment may provide an additional mode of activation in tandem with the user's gaze. This additional activation step could include current methods of activation such as pressing and holding a particular key while the user's gaze is located at a predetermined location (e.g., the button to be pressed). Additionally or alternatively, an embodiment could make use of a key phrase as the additional mode of activation (e.g., referencing the animated character 403 by name when focused on him).

In addition to the above mentioned existing trigger methods gaze tracking enables alternative methods. For example, an embodiment may allow a user to blink once or twice with one or both eyes before activation of the intelligent personal assistant. This additional step allows for a higher degree of competency without requiring a great deal of additional effort by the user, and without being overly burdensome (e.g., repeating the same key phrase each time the user wishes it activate the personal assistant).

Additionally or alternatively, an embodiment may allow the user to move their device (e.g., tablet, smartphone, personal computer, etc.) in combination with utilizing their gaze. For example, if a user affixed their gaze upon the predetermined icon and the icon's visual state changed, the user could flick or alter the position or angle of their device (i.e., utilize the accelerometer) as the second modality to verify their intent to activate the intelligent personal assistant. This has the addition of the increased competency, without the need of a second hand or requiring the user to repeat an annoying key phrase.

Additionally or alternatively, an embodiment may, for example, allow the user send an electronic communication to their device (e.g., through a Bluetooth headset, near field communication device, etc.) in combination with utilizing their gaze. For example, if a user affixed their gaze upon the predetermined icon and the icon's visual state changed, the user could interact with a separate device (e.g., press a button on their Bluetooth headset) to verify their intent to activate the intelligent personal assistant.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting, at a display device of an electronic device, a location of user gaze;
    activating, based on the location of the user gaze, a voice input module of a digital assistant, wherein the activating is based on a command input using a modality that detects an input in combination with the location of the user gaze, the modality comprising a change in velocity of the device;
    detecting, at the electronic device and after activation of the voice input module, a voice input; and
    performing, based on the voice input, at least one action, wherein the performed at least one action is irrespective of the location of the user gaze.

2. The method of claim 1, wherein the voice input module activation is triggered by the location of user gaze being focused on a characteristic selected from a group consisting of: a predetermined location, an icon, an anthropomorphic agent, a user selected image, and a third party created agent.

3. The method of claim 2, further comprising changing a visual state of the characteristic in response to the user gaze being focused on the characteristic.

4. The method of claim 2, wherein the location of the characteristic is determined based on a factor selected from a group consisting of: user selection, third party application preference, and current device task.

5. The method of claim 1, wherein detecting a location of user gaze comprises: using a sensor device to detect the user gaze.

6. The method of claim 5, wherein the sensor device is selected from a group consisting of: an image capture device, a video capture device, a range imaging device, and a 3D scanning device.

7. The method of claim 1, wherein detecting a voice input comprises: using an audio capture device to detect audio.

8. The method of claim 7, wherein the audio detected comprises voice commands from the user.

9. The method of claim 1, wherein the modality detects an input selected from a group consisting of: facial manipulation, a change in velocity of the device, an electronic communication, a key phrase, and a button press.

10. An information handling device, comprising:
    a display device;
    a processor operatively coupled to the display device;
    at least one sensor operatively coupled to the processor; and
    a memory that stores instructions executable by the processor to:
    detect a location of user gaze on the display device;
    activate, based on the location of the user gaze, a voice input module of a digital assistant, wherein the activating is based on a command input using a modality that detects an input in combination with the location of the user gaze, the modality comprising a change in velocity of the device;
    detect, after activation of the voice input module, a voice input using the at least one sensor; and
    perform, based on the voice input, at least one action, wherein the performed at least one action is irrespective of the location of the user gaze.

11. The me information handling device of claim 10, wherein voice input module activation is triggered by the location of user gaze being focused on a characteristic selected from a group consisting of: a predetermined location, an icon, an anthropomorphic agent, a user selected image, and a third party created agent.

12. The information handling device of claim 11, further comprising changing a visual state of the characteristic in response to the user gaze being focused on the characteristic.

13. The information handling device of claim 11, wherein the location of the characteristic is determined based on a factor selected from a group consisting of: user selection, third party application preference, and current device task.

14. The information handling device of claim 10, wherein detecting a location of user gaze comprises: using a sensor device selected from a group consisting of: an image capture device, a video capture device, a range imaging device, and a 3D scanning device.

15. The information handling device of claim 10, wherein detecting a voice input comprises: using an audio capture device to detect audio.

16. The information handling device of claim 15, wherein the audio detected comprises voice commands from the user.

17. The information handling device of claim 10, wherein the modality detects an input selected from a group consisting of: facial manipulation, a change in velocity of the device, an electronic communication, a key phrase, and a button press.

18. A product, comprising:
    a storage device having code stored therewith, the code being executable by the processor and comprising:
    code that detects a location of a user gaze on a display device;
    code that activates, based on the location of the user gaze, a voice input module of a digital assistant, wherein the activating is based on a command input using a modality that detects an input in combination with the location of the user gaze, the modality comprising a change in velocity of the device;
    code that detects, after activation of the voice input module, a voice input using a modality; and code that performs, based on the voice input, at least one action, wherein the performed at least one action is irrespective of the location of the user gaze.

* * * * *